(12) United States Patent
Srivastava et al.

(10) Patent No.: US 12,039,414 B1
(45) Date of Patent: Jul. 16, 2024

(54) SYSTEM AND METHOD FOR QUANTIFYING UNCERTAINTY IN MACHINE LEARNING MODELS

(71) Applicant: Intuit Inc., Mountain View, CA (US)

(72) Inventors: Ashok N. Srivastava, Mountain View, CA (US); Kumar Sricharan, Mountain View, CA (US); Kumar Kallurupalli, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 1436 days.

(21) Appl. No.: 16/438,012

(22) Filed: Jun. 11, 2019

(51) Int. Cl.
*G06N 20/00* (2019.01)
*G06F 17/18* (2006.01)
*G06F 18/214* (2023.01)
*G06F 18/2431* (2023.01)
*G06N 3/08* (2023.01)

(52) U.S. Cl.
CPC ............. *G06N 20/00* (2019.01); *G06F 17/18* (2013.01); *G06F 18/2155* (2023.01); *G06F 18/2431* (2023.01); *G06N 3/08* (2013.01)

(58) Field of Classification Search
CPC .... G06N 7/023; G06N 7/00; G06N 3/08–088; G06N 5/00
See application file for complete search history.

(56) References Cited

U.S. PATENT DOCUMENTS

| | | | | |
|---|---|---|---|---|
| 9,519,868 | B2 * | 12/2016 | Criminisi | G06N 20/20 |
| 10,127,497 | B2 * | 11/2018 | Eslami | G06N 20/10 |
| 2012/0008838 | A1 * | 1/2012 | Guyon | G16H 50/20 |
| | | | | 382/128 |

OTHER PUBLICATIONS

Chien-Liang Liu, Enhancing Text Classification with the Universum, 2016, pp. 1147-1153.*
Wang, H et al., "Large unbalanced credit scoring using lasso-logistic regression ensemble," PloS one, vol. 10 No. 2 (2015) 20 pp. (Year: 2015).*
Saito, K. et al., "Semi-supervised domain adaptation via minimax entropy," downloaded from <arxiv.org/abs/1904.06487> (Apr. 16, 2019) 12 pp. (Year: 2019).*

* cited by examiner

*Primary Examiner* — Brian M Smith
(74) *Attorney, Agent, or Firm* — Paradice & Li LLP

(57) ABSTRACT

A method and system assists train a classifier model with a machine learning process. The method and system trains the classifier with a labeled training set and with an unlabeled training set. The method and system trains the classifier model to correctly classify data items that fall within a distribution of the labeled training set. The method and system trains the classifier to indicate a lack of confidence in classification for data items that do not fall within the distribution of the labeled training set.

19 Claims, 7 Drawing Sheets

SYSTEM AND METHOD FOR QUANTIFYING UNCERTAINTY IN MACHINE LEARNING MODELS

BACKGROUND

Machine learning models are utilized to assist in a large variety of data management processes. In many cases machine learning models are used to make predictions based on data. These predictions are used for a variety of applications in the real world. In particular, many data management systems utilize machine learning models to assist in predicting cash flow, to recommended self-help articles, and to improve understanding of user dialogue in order to provide assistance to users.

Classifier models are machine learning models that are trained to classify data items as belonging to one of multiple categories. Classifiers are trained with a set of labeled data items. The data items are labeled according to a classification. Classifiers are trained to correctly reproduce the known labels of the labeled data items. After the training process, classifiers are able to accurately classify many data items that are typical of the data items from the training set.

However, traditional classifier models suffer from some drawbacks. For example, if a traditional classifier model receives a data item that is outside the distribution of the labeled training set data items, the traditional classifier model may confidently predict a classification for the data item even though the traditional classifier is likely unable to correctly classify the data item because the data item is not of any type represented in the labeled training set data.

When a classifier model confidently returns classification predictions for data items outside of the distribution of the labeled training set, users of the traditional classifier model can suffer adverse consequences.

In order to remedy this problem, attempts have been made to utilize parametric machine learning methods. This class of techniques assumes a specific structure for the machine learning model and leverages this structure to produce confidence intervals. However, the structure assumption can oftentimes be too narrow to accurately model real data, and as a result, the outputs of these models are not very accurate.

Other attempts have tried to address this problem by utilizing nonparametric machine learning methods. This class of techniques is much more powerful in terms of modeling capability than the parametric methods, but has the disadvantage that in the absence of the structures that are present in the parametric methods, producing confidence intervals is a difficult problem. The techniques used to address this problem are not scalable to the large size of modern data sets.

More recently, there have been attempts to produce confidence intervals using variational approaches. However, these approaches assume some specific structure of the models, which places these techniques as a hybrid between the parametric and nonparametric methods, which then results in some of the original problems with pure parametric methods such as lower accuracy and inability to apply to pure nonparametric models.

What is needed is a method and system that provides a technical solution to the technical problem of effectively and efficiently training an analysis model to correctly classify relevant data items while refraining from classifying data items that that fall outside the scope of a labeled training set.

SUMMARY

Embodiments of the present disclosure provide one or more technical solutions to the technical problem of effectively and efficiently training an analysis model to correctly classify relevant data items while refraining from classifying data items that fall outside the scope of a labeled training set. A machine learning training process trains an analysis model with multiple types of data items. The various types of data items are selected so that the analysis model can correctly classify data items that fall within the scope of the training set, and refrain from classifying data items that do not fall within the training set.

The training set includes a set of labeled data items, a set of unlabeled data items that fall outside the scope of the labeled data items, and a set of unlabeled data items that fall within the scope of the labeled data items. The training process trains the analysis model with a machine learning process to accurately classify the labeled data items, to increase the uncertainty in classifying the unlabeled data items that fall outside the scope of the labeled data items, and to reduce the uncertainty in classifying the unlabeled data items that fall within the scope of the labeled data items. The result is that the analysis model will accurately classify data items that fall within the scope of the labeled training set data items and will return a prediction that indicates a lack of confidence in classifying data items that fall outside the scope of the labeled training set data items.

The analysis model includes multiple analysis sub-models. Each sub-model is trained in accordance with a machine learning process. Each sub-model may be trained to correctly classify data items that fall within the scope of a labeled training set. Each sub-model will differ in how the unlabeled data that falls outside the scope of the labeled training set data will be classified. When the models are in agreement, the confidence interval in the classification is high. When the models are not in agreement, the confidence interval in the classification is low. The machine learning process for the various sub-models ensures that they will not treat the out-of-scope data items the same, thus ensuring low confidence in a classification of these items.

Embodiments of the present disclosure overcome many of the drawbacks of traditional processes for training analysis models. Machine learning processes in accordance with embodiments of the present disclosure train an analysis model to confidently classify data items that fall within a distribution of labeled training set data items and to return an indication of lack of confidence in classifying data items that fall outside the distribution of labeled training set data items while utilizing significantly less memory and processing resources than traditional methods for training analysis models. The result is a machine learning process that is both efficient and effective in training analysis models.

Figure 1:
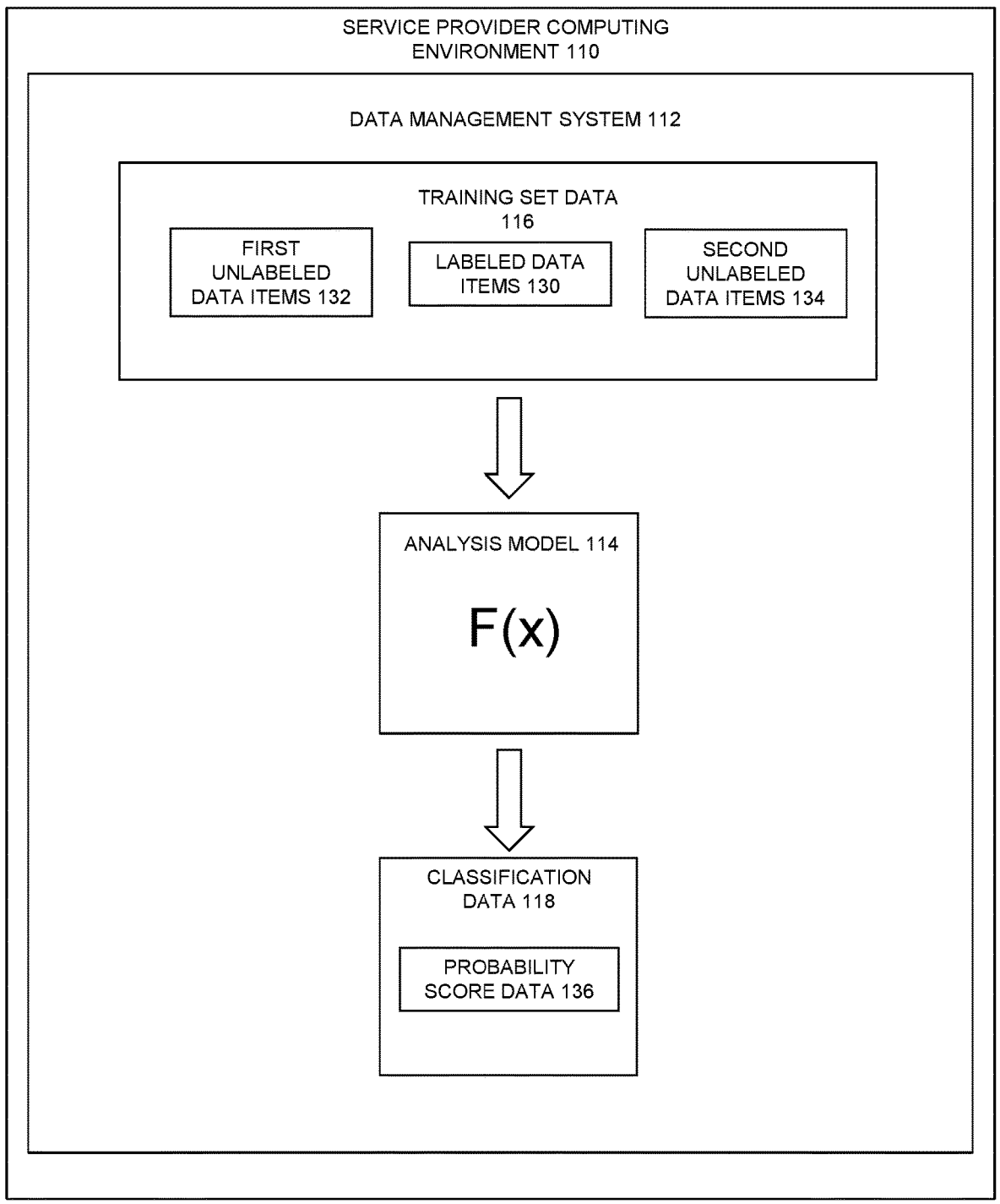
FIG. 1 is a block diagram of a system for efficiently and effectively training an analysis model with a machine learning process, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and described below. Rather, these exemplary embodiments are provided to allow a complete disclosure that conveys the principles of the invention, as set forth in the claims, to those of skill in the art.

FIG. 1 illustrates a block diagram of a production environment 100 for efficiently and effectively training an analysis model with a machine learning process, according to one embodiment. Embodiments of the present disclosure provide methods and systems for efficiently and effectively training an analysis model with a machine learning process, according to one embodiment. Embodiments of the present disclosure train an analysis model to accurately and confidently classify data items that fall within the scope of a labeled training set. Embodiments of the present disclosure also train the analysis model to return a lack of confidence in classifying data items that fall outside the scope of the labeled training set.

Referring to FIG. 1, the production environment 100 includes a service provider computing environment 110 for efficiently and effectively training an analysis model with a machine learning process, according to one embodiment. The service provider computing environment 110 represents one or more computing systems such as one or more servers or distribution centers that are configured to receive, execute, and host one or more training set labeling systems (e.g., applications) for access by one or more users, for efficiently and effectively training an analysis model with a machine learning process, according to one embodiment. The service provider computing environment 110 can represent a traditional data center computing environment, a virtual asset computing environment (e.g., a cloud computing environment), a hybrid between a traditional data center computing environment and a virtual asset computing environment, or other kinds of computing environments, as discussed herein, known in the art, or as become known after the time of filing.

The service provider computing environment 110 includes a data management system 112. The data management system 112 is configured to train an analysis model and to implement the analysis model in data management processes.

The data management system 112 includes an analysis model 114. The data management system 112 trains the analysis model 114 with a machine learning process to correctly classify data items within a selected scope and to indicate lack of confidence in classifying data items outside the selected scope.

The data management system 112 utilizes training set data 116 to train the analysis model 114 with a machine learning process. During the machine learning process, the training set data 116 is fed to the analysis model 114. The analysis model 114 generates classification data 118. The machine learning process trains the analysis model 114 to learn a function, or functions, F(x) to output classification data 118 having selected characteristics.

The training set data 116 includes labeled data items 130, first unlabeled data items 132, and second unlabeled data items 134. The data management system 112 utilizes these three types of training set data in a single machine learning process to train the analysis model 114 to generate classification data 118 having selected characteristics.

The machine learning process trains the analysis model 114 to accurately classify the labeled data items in accordance with their various labels. The labeled data items 130 are data items that have a known label attached to them. During the machine learning process, the analysis model 114 is trained to classify the labeled data items 130 in accordance with their labels. In other words, during the machine learning process, the analysis model 114 is trained to reproduce the labels for the labeled data items 130.

The labeled data items 130 can correspond to data items of a type which the analysis model 114 is intended to correctly classify. The labeled data items 130 define a distribution or scope within which, once the analysis model 114 has been trained, the analysis model 114 can confidently classify data items.

The analysis model 114 includes a plurality of analysis sub-models. Each sub-model is trained to accurately classify the labeled data items 130. The machine learning process is such that each sub-model will classify the labeled data items 130 in accordance with different respective functions, though each function will agree on a classification for the labeled data items 130.

The first unlabeled data items 132 correspond to data items that fall outside the scope or distribution defined by the labeled data items 130. The first unlabeled data items 132 correspond to data items of a type or types that the analysis model 114 is not expected to classify. Thus, the first unlabeled data items 132 are data items that are different from the labeled data items 130 in variety of ways.

The machine learning process trains the analysis model to maximize a level of uncertainty or lack of confidence in classifying the first labeled data items 132. Whereas the data management system 112 trains the analysis model 114 to correctly and confidently identify, for a given labeled data item 130, one category out of several possible categories as the category to which the labeled data items belongs, the data management system 112 trains the analysis model 114 to reduce or minimize, for a given first unlabeled data item 132, the confidence with which the first unlabeled data item could be classified as belonging to anyone of the possible categories. Thus, rather than confidently classifying the first unlabeled data items 132, the data management system 112 trains the analysis model 114 to be distinctly unconfident in classifying the first unlabeled data items 132.

In an example in which the analysis model 114 includes a plurality of analysis sub-models each trained to correctly classify the labeled data items 130, the sub-models will not all agree on classifications for the first unlabeled data items. Each sub-model will classify in accordance with a different respective function. Though each function will agree on a classification for the labeled data items 130, the random nature of the functions will ensure that the sub-models do not all agree on classifications for the first unlabeled data items 132. The result is that the analysis model will have a high degree of uncertainty in classifying the first unlabeled data items 132.

The second unlabeled data items 134 are data items that have no label but that fall within the scope or distribution defined by the labeled data items 130. Accordingly, the second unlabeled data items 134 are data items of a type or types that the analysis model 114 is intended to correctly classify. Thus, the second unlabeled data items 134 are different from the first unlabeled data items 132 in that the first unlabeled data items 132 fall outside the scope or distribution defined by the labeled data items 130, whereas the second unlabeled data items 134 fall within the scope or distribution defined by the labeled data items 130.

The data management system 112 trains the analysis model 114 to reduce or minimize an uncertainty in classifying the second unlabeled data items 134 with one of the possible classifications. Thus, during the machine learning process, the data management system 112 trains the analysis model 114 to confidently classify the second unlabeled data items 134. In this way, the data management system 112 trains the analysis model 114 to classify the second unlabeled data items 134 differently than the first unlabeled data items 132.

The data management system 112 trains the analysis model 114 to reduce or minimize uncertainty in classifying the second unlabeled data items 134 by training the analysis model to correctly classify the labeled data items 130, which are similar to the unlabeled data items 134.

In one example, the data management system 112 is a financial management system that assists users to manage and categorize financial transactions. The data management system collects, for each user, financial management data. The user financial management data can include, for each user, a list of the financial transactions in which the user has been involved. Each financial transaction is characterized by a transaction string. The transaction string is often unintelligible to the casual observer and appears as garbled strings of alphanumeric characters. Nevertheless, these transaction strings include data that can identify the merchant or type of merchant involved in the financial transactions. The data management system 112 can utilize the analysis model 114 to identify the merchants or types of merchants involved in the financial transactions based on the transaction strings.

Continuing with the example in which the analysis model 114 is intended to classify transaction strings, in accordance with one embodiment, the labeled data items 130 include transaction strings that are labeled according to the type of merchant involved in the transaction strings. The data management system 112 utilizes a machine learning process to train the analysis model 114 to correctly classify each of the labeled data items 130 in accordance with the type of merchant indicated by their labels. Accordingly, the transaction strings in the labeled data items 130 correspond to genuine transaction strings retrieved in the process of providing financial management services to users.

Continuing with the example in which the analysis model 114 is intended to classify transaction strings, the first unlabeled data items 132 correspond to data items other than genuine financial transaction strings retrieved by the data management system 112. For example, the first unlabeled data items 132 could include randomly generated alphanumeric strings, text related to financial transactions, or data items that are otherwise different from and outside the scope of the labeled data items 130.

Continuing with the example in which the analysis model 114 is intended to classify transaction strings, the second unlabeled data items 134 include genuine transaction strings that do not have any labels. Thus, the second unlabeled data items 134 are of the same type as and fall within the scope or distribution of the labeled data items 130.

Continuing with the example in which the analysis model 114 is intended to classify transaction strings, the data management system 112 trains the analysis model 114, with a machine learning process, to correctly categorize the labeled transaction strings in accordance with their labels. The data management system 112 trains the analysis model 114, with the machine learning process, to generate uncertain classifications for the first unlabeled data items 132 that fall outside the scope or distribution of the labeled transaction strings. The data management system 112 trains the analysis model 114, with the machine learning process, to classify the second unlabeled data items 134 with a high degree of confidence.

Continuing with the example in which the analysis model 114 is intended to classify transaction strings, the machine learning process has trained the analysis model 114 to correctly and confidently categorize genuine transaction strings. The machine learning process has trained the analysis model 114 to classify data items other than genuine transaction strings in an uncertain or incompetent manner. After the machine learning process, if a data item other than a genuine transaction string is passed to the analysis model 114, the analysis model 114 can output an indication of unconfident classification. In this way, the machine learning process trains the analysis model 114 to avoid outputting misleading classifications for the data items other than genuine transaction strings or transaction strings that do not fall within the scope or distribution of the labeled data items 130.

During the machine learning process, the second unlabeled data items 134 correspond to the labeled data items 130 stripped of their labels. Thus, for the machine learning process, the labeled data items 130 can be duplicated and stripped of their labels to be used as the second unlabeled data items 134. This ensures that the second unlabeled data items 134 fall within the scope of the training set of labeled data items. Alternatively, the second unlabeled data items 134 can be hand-selected by experts from the same source from which the labeled data items 130 are drawn. As the experts identify data items suitable for the labeled data items 130, the experts can set apart some of these suitable data items for inclusion with the second unlabeled data items 134. Thus, while the experts select labeled data items 130, they can simultaneously select data items for the second unlabeled data items 134.

During the machine learning process, and after the analysis model has been trained, 114, the classification data 118 includes probability score data 136. For each data item from the training set data 116, the analysis model 114 generates probability score data 136. The probability score data 136 for a given data item includes, for each possible classification, a probability score that the data item belongs to that classification. If the analysis model 114 returns a probability score that is greater than a threshold probability score for a particular classification, the data item can be classified as belonging to that classification.

In one illustrative example, the threshold probability score is 0.8. Alternatively, the threshold probability score can be 0.7 or 0.9. The experts that manage the analysis model 114 can select a threshold probability score in accordance with the particular use to which the analysis model 114 will be put.

During the machine learning process, the analysis model 114 is trained to correctly classify the labeled data items 130. Thus, during the machine learning process, the analysis model 114 is trained to classify each labeled data item 130 with a probability score in the correct classification greater than the threshold probability score. In this way, the analysis model 114 is trained to accurately reproduce the labels or classifications of the labeled data items 130.

During the machine learning process, the analysis model 114 can be trained to increase the uncertainty in classifying the first unlabeled data items 132. The analysis model 114 is trained to generate, for each unlabeled data item 132, a distribution of probabilities for the various classifications that collectively does not indicate that the data item likely belongs to any of the classifications. In other words, the analysis model 114 is trained to generate, for each unlabeled data item 132, a distribution of probability scores that are highly uniform. If the probability scores for each classification are nearly uniform, then the analysis model 114 does not have confidence in classifying the data item as belonging to any one of the classifications.

During the machine learning process, the analysis model 114 can be trained to maximize or increase the uncertainty by reducing a difference between a greatest probability score and lowest probability score for a given data item from the first unlabeled data items 132. In other words, for a given first unlabeled data item 132, the analysis model 114 is trained to generate a distribution of probability scores in which the difference between the classification with the highest probability score and the classification with the lowest probability score is as small as possible.

During the machine learning process, the analysis model 114 can be trained to maximize or increase the uncertainty for a given unlabeled data item 132 by increasing an entropy of the probability scores for each classification. During the machine learning process, the analysis model 114 calculates, for each data item, an entropy for the distribution of probability scores. The more uniform the probability scores, the higher the entropy of the distribution of probability scores. The machine learning process trains the analysis model 114 to increase or maximize the entropy of the distribution of probability scores for those unlabeled data items that do not fall within the scope of the labeled data items.

Training the analysis model 114 to reduce the uncertainty for second unlabeled data items 134 includes generating a distribution of probability scores in which one of the probability scores is significantly higher than the others. During the machine learning process, for each second unlabeled data item 134, the analysis model 114 is trained to generate a probability score for one of the classifications having a higher than threshold probability score. In this way, the analysis model 114 is trained to confidently classify data items that fall within the scope of the distribution of the labeled data items 130.

Training the analysis model 114 to reduce the uncertainty for the second unlabeled data items 134 includes reducing an entropy of the distribution of probability scores. For a given unlabeled data item that falls within the scope of the distribution of the labeled data items, the analysis model 114 is trained to minimize the entropy. Minimizing the entropy includes generating a probability score for one of the classifications that is significantly higher than any of the other probability scores for the other classifications.

The analysis model 114 can include a neural network. The neural network defines a function $F(x)$ with a series of weighted data values. The neural network generates a probability score for each possible classification based on the function and the weighted data values. During the machine learning process, the analysis model 114 iteratively refines the weights for the various data values in the function. In particular, during the machine learning process, the analysis model 114 adjusts the weights of the data values to correctly classify labeled data items, to increase the uncertainty in classifying unlabeled data items that fall outside the scope of the labeled data items, and to reduce the uncertainty in classifying unlabeled data items that fall within the scope of the labeled data items. After the machine learning process is complete, the neural network can accurately classify data items that fall within the scope of the labeled training set data items and will return an indication of low confidence in classifying data items that fall outside the scope of the labeled training set data items.

The analysis model 114 includes a plurality of analysis sub-models each including a neural network that defines a different function $F(x)$ for correctly classifying the labeled data items 130. Each function $F(x)$ will have differently weighted data values. Each function correctly classifies the labeled data items 130 and the second unlabeled data items 134. However, the functions $F(x)$ will not all agree on classifying data items that fall outside the scope of the labeled data items 130. The aggregation, for a given first unlabeled data item 132, of the probability scores from each function will result in uncertainty in classifying the first unlabeled data item 132 with any one classification.

In one embodiment, the analysis model is trained with labeled data items and unlabeled data items. The unlabeled data items include unlabeled data items that fall within the scope or distribution of the labeled data items, and unlabeled data items that fall outside the scope or distribution of the labeled data items. The machine learning process trains the analysis model to accurately classify the labeled data items, to maximize or increase a lack of confidence in classifying the unlabeled data items that fall outside the scope or distribution of the labeled data items, and to minimize or reduce the uncertainty in classifying the unlabeled data items that fall within the scope of the labeled data items.

This machine learning process results in an analysis model that accurately and confidently classifies data items that fall within the scope of the labeled training set data items and that returns a lack of confidence in classifying data items that fall outside the scope of the labeled training set data items. Thus, individuals and organizations that use an analysis model trained in accordance with principles of the present disclosure will not rely on classifications of data items that fall outside the scope or distribution of the labeled data items with which the analysis model is trained.

The analysis model includes multiple analysis sub-models. Each sub-model is trained in accordance with a machine learning process. Each sub-model may be trained to correctly classify data items that fall within the scope of a labeled training set. Each sub-model will differ in how the unlabeled data that falls outside the scope of the labeled training set data will be classified. When the sub-models are in agreement, the confidence interval in the classification is high. When the models are not in agreement, the confidence interval in the classification is low. The machine learning process for the various sub-models ensures that they will not treat the out of scope data items the same, thus ensuring low confidence in a classification.

In one example, the analysis model is an analysis model that is trained to correctly classify handwritten numerals. The analysis model is trained with a labeled training set of handwritten numerals. The labels identify the correct classification of each handwritten numeral. The analysis model is also trained with an unlabeled training set of handwritten numerals. The unlabeled training set of hand-written numerals falls within the scope or distribution of the labeled handwritten numerals. The analysis model is also trained with an unlabeled training set of data items that fall outside the scope of the labeled handwritten numerals. The unlabeled data items that fall outside the scope of the labeled handwritten numerals include handwritten letters, typed numerals, and typed letters. In other words, the unlabeled data items that fall outside the scope of the labeled handwritten numerals include items other than the handwritten numerals that the analysis model is intended to classify.

During the machine learning process, the analysis model is trained to accurately classify or reproduce the labels of the labeled handwritten numerals. During the machine learning process, the analysis model is trained to return a lack of confidence in classifying the unlabeled data items that do not include handwritten numerals. During the machine learning process, the analysis model is trained to confidently classify the unlabeled handwritten numerals.

After the machine learning process, the analysis model will accurately and confidently classify data items that are handwritten numerals. The analysis model will output a lack of confidence in classifying data items that are not handwritten numerals. For example, if a handwritten letter, a typed letter, or a typed numeral is fed to the analysis model, the analysis model will provide an output that indicates a lack of confidence in classifying that particular data item.

An analysis model trained with traditional machine learning processes to classify handwritten numerals might receive a handwritten letter "A" and confidently classify the handwritten letter "A" as the numeral "4". The analysis model trained with machine learning processes in accordance with principles of the present disclosure would receive a handwritten letter "A" and return an output indicating that the data item cannot be confidently classified. Thus, the analysis model trained in accordance with principles of the present disclosure will not provide unduly confident classifications for data items that fall outside the scope of the labeled training set with which the analysis model is trained.

In another example, an analysis model is implemented within a data management system that assists users to prepare tax returns. The data management system includes a conversational user interface (CUI) that enables users to type in questions, or to speak questions, and to receive answers from the data management system. The CUI utilizes an analysis model to detect when user text or utterances correspond to a tax related question. The analysis model is trained with a series of text items or audio items that are labeled as being either tax related or not tax related. The analysis model is trained with a series of text items or audio items that are similar to the labeled text or audio items but that are unlabeled. The analysis model is also trained with a series of items that do not fall within the scope of the labeled training items. The analysis model is trained to accurately and confidently classify items that fall within the scope of the labeled training set and to return an indication of lack of confidence in classifying data items that fall outside the scope of the labeled training sets. The CUI can then confidently address tax related questions and can prompt the user to restate questions that cannot confidently be classified as tax related questions.

During the machine learning process, the unlabeled data items that fall within the scope of the labeled data items correspond to the labeled data items stripped of their labels. Thus, for the machine learning process, the labeled data items can be duplicated and stripped of their labels to be used as unlabeled data items that fall within the scope of the labeled data items. This ensures that those unlabeled data items fall within the scope of the training set of labeled data items.

In one embodiment, for a given data item, the analysis model calculates, for each of a plurality of possible classifications, a respective probability score. The probability score corresponds to a probability that the data item belongs to the classification. If the analysis model returns a probability score that is greater than a threshold probability score for a particular classification, the data item is classified as belonging to that classification.

In one embodiment, for a given data item, the probability score for a particular classification is a combination or average of probability scores generated by different sub-models. If each sub-model generates, for a given data item, a high probability score for a particular classification, then the overall probability score for that classification will be high, and the uncertainty will be low. If the various sub-models do not agree on a high probability score for any one classification, then the overall probability score will not be high for any one classification, resulting in low confidence or high uncertainty in a classification.

During the machine learning process, the analysis model is trained to correctly classify the labeled data items. Thus, during the machine learning process, the analysis model is trained to classify each labeled data item with a probability score that is greater than a threshold probability in the correct classification score. In this way, the analysis model is trained to accurately classify the labeled data items.

During the machine learning process, the analysis model is trained to increase the uncertainty in classifying the unlabeled data items that do not fall within the first distribution. The analysis model is trained to generate, for each unlabeled data item that does not fall within the first distribution, a distribution of probabilities for the various classifications that collectively does not indicate that the data item likely belongs to any of the classifications. In other words, the analysis model is trained to generate, for each unlabeled data item that does not fall within the first distribution, a distribution of probability scores that are as uniform as possible. If the probability scores for each classification are nearly uniform, then the analysis model does not have confidence in classifying the data item as belonging to any one of the classifications.

During the machine learning process, the analysis model is trained to maximize or increase the uncertainty by reducing a difference between a greatest probability score and lowest probability score for a given data item. In other words, for a given unlabeled data item that does not fall within the scope of the labeled data items, the analysis model is trained to generate a distribution of probability scores in which the difference between the classification with the highest probability score and the classification with the lowest probability score is as small as possible.

During the machine learning process, the analysis model is trained to maximize or increase the uncertainty by increasing an entropy of the probability scores for each classification. During the machine learning process, the analysis model calculates, for each data item, an entropy for the distribution of probability scores. The more uniform the probability scores, the higher the entropy of the distribution of probability scores. The machine learning process trains the analysis model to increase or maximize the entropy of the distribution of probability scores for those unlabeled data items that do not fall within the scope of the labeled data items.

Training the analysis model to reduce the uncertainty for unlabeled data items that fall within the scope of the distribution of the labeled data items includes generating a distribution of probability scores in which one of the probability scores is significantly higher than the others. During the machine learning process, for each unlabeled data item that falls within the first distribution, the analysis model is trained to generate a probability score for one of the classifications having a higher than threshold probability score. In this way, the analysis model is trained to confidently classify data items that fall within the scope of the distribution of the labeled data items.

Training the analysis model to reduce the uncertainty for unlabeled data items that fall within the scope of the distribution of the labeled data items includes reducing an entropy of the distribution of probability scores. For a given unlabeled data item that falls within the scope of the distribution of the labeled data items, the analysis model is trained to minimize the entropy. Minimizing the entropy includes generating a probability score for one of the classifications that is significantly higher than any of the other probability scores for the other classifications.

The analysis model can include a neural network. The neural network defines a function with a series of weighted data values. The neural network generates a probability score for each possible classification based on the function and the weighted data values. During the machine learning process, the analysis model iteratively refines the weights for the various data values in the function. In particular, during the machine learning process, the analysis model adjusts the weights of the data values to correctly classify labeled data items, to increase the uncertainty in classifying unlabeled data items that fall outside the scope of the labeled data items, and to reduce the uncertainty in classifying unlabeled data items that fall within the scope of the labeled data items. After the machine learning process is complete, the neural network can accurately classify data items that fall within the scope of the labeled training set data items and will return an indication of low confidence in classifying data items that fall outside the scope of the labeled training set data items.

In one example, the machine learning process can train the analysis model 114 to minimize the entropy for the labeled data items 130 and to maximize the entropy for the unlabeled data items 132 because the output of the function $F(x)$ has two terms. Each term is a respective distribution of probability scores for the various possible classes. When the training set data 116 is passed to the analysis model 114, the training set data has both labeled data items 130 and first unlabeled data items 132. The first unlabeled data items 132 are unlabeled in the sense that they do not have a label assigning them to any of the possible classes, whereas the correct classes for the labeled data items 130 are known. However, the first unlabeled data items 132 are known to the analysis model 114 as belonging to a group that is separate from the labeled data items 130. Accordingly, the training set data 116 does indicate which data items are labeled data items 130 and which data items are first unlabeled data items 132. The first output term of the function $F(x)$ is based on the labeled data items 130. The second output term of the function $F(x)$ is based on the first unlabeled data items 132.

The unlabeled data items 130 and the first unlabeled data items 132 are passed simultaneously to the analysis model 114 in the training set data 116 during the training process. During the training process the weighted values are adjusted to cause the first term to output a significantly higher probability score for the single correct class. This corresponds to minimizing the entropy. During the training process the weighted values are adjusted to cause the second term of the output function to spread toward a more even distribution among the possible classes. This corresponds to maximizing the entropy.

The data management system can use the classification data to take actions related to the predictions. In an example in which the management system 112 is a bookkeeping system, the analysis model may classify a user as belonging to a particular group of users. If the probability score data related to this classification indicates a level of confidence in this classification that is higher than a threshold level of confidence, then the data management system 112 can take actions responsive to the classification. These actions can include outputting a modified user interface to the user based on the classification, offering an increased level of assistance regarding particular features of the bookkeeping system, sending alerts to the user, or sending communications to the user. Thus, in one embodiment, the data management system 112 takes actions related to users of the data management system based on the classification data 118.

Figure 2:
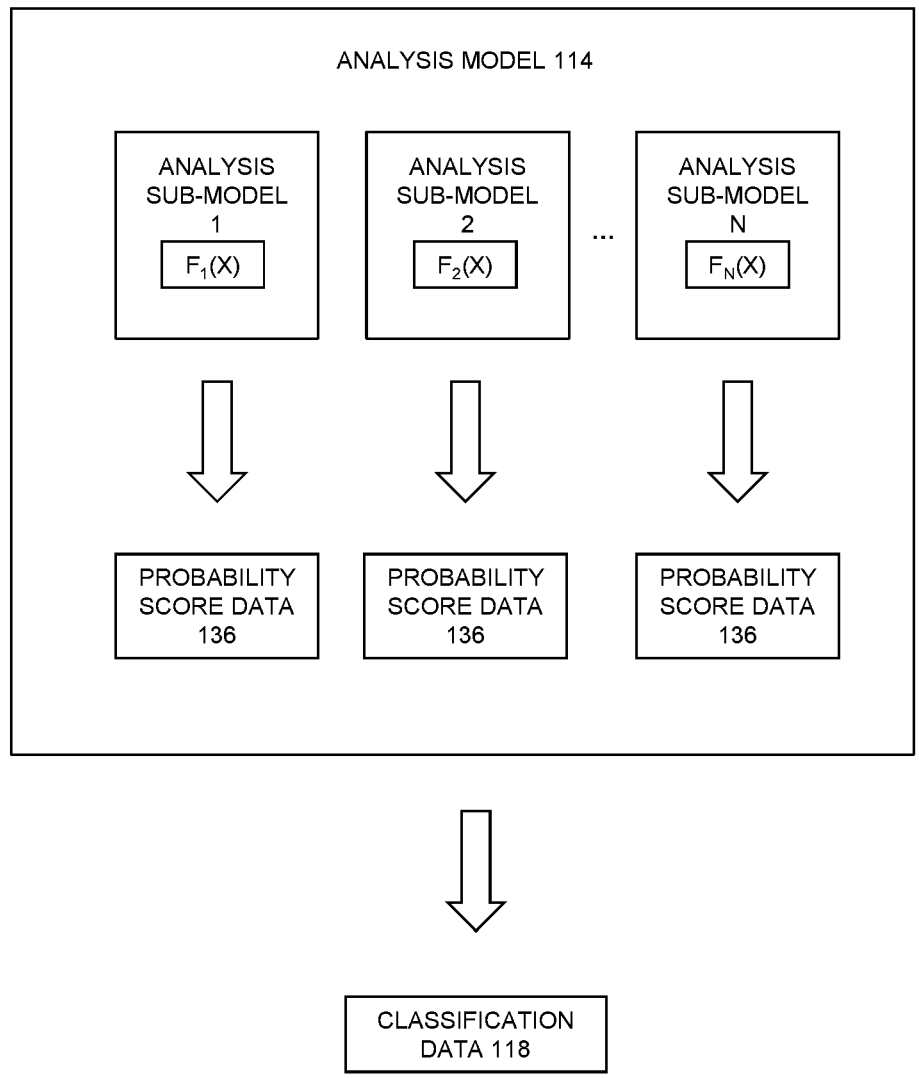
FIG. 2 is a block diagram of an analysis model, in accordance with one embodiment.

FIG. 2 is a block diagram of the analysis model 114 of FIG. 1, in accordance with one embodiment. The analysis model 114 includes a plurality, N, of analysis sub-models. The training process for the analysis model 114 trains each individual analysis sub-model to receive a data item and to generate probability score data 136 indicating the probable classification for the data item. The analysis model 114 outputs classification data 118 based on the probability score data 136 for each of the analysis sub-models.

The machine learning training process trains each analysis sub-model to correctly classify the labeled data items 130. Each analysis sub-model includes a neural network. The neural network defines a classification function $F(x)$. The classification function $F(x)$ is based on k weighted values. During the machine learning process, each analysis sub-model adjusts the weights assigned to each of the k weighted values until the analysis sub-model is able to correctly classify the labeled data items 130.

The analysis sub-models can be substantially the same as each other in the sense that they are the same type of model. They are neural networks that have the same number of neurons and layers. They are trained with the same machine learning process. However, as set forth in more detail below, their various functions $F(x)$ are not identical.

The nature of neural networks is such that there are multiple different distributions of weighted values that can result in a function that correctly classifies the labeled data items. When the analysis sub-models are trained, each of them ends up with a respective function $F(x)$ with different weighted values, even though they are trained simultaneously with the same training set data 116. Before the training process begins, each analysis sub-model is assigned a different set of initial weights for the k weighted values. The different initial weights for the weighted values ensure that, after the training process, each analysis sub-model will have a different set of weighted values for their respective functions yet each of these functions correctly classifies the labeled data items 130.

Each analysis sub-model is a classifier model. Each analysis sub-model is trained to classify a data item as belonging to one of j possible classes. In practice, the function $F(x)$ does not output a binary value for each class. Instead, the function generates, for each possible class, a probability score that the data item belongs to that class. If the probability score for one class is substantially higher than the probability score for each of the other classes, then the data value can be classified as belonging to that class. In one example, the class with a probability score higher than a threshold probability score is determined to be the correct class. If no class has a probability score higher than the threshold probability score, then the data item is not classified as belonging to any of the classes.

The analysis model 114 takes the probability score data 136 from each analysis sub-model and combines and normalizes them. If the combined probability score data indicates that one of the classes has a substantially higher probability score then all of the other classes, or a probability score that is higher than a threshold probability score, then the classification data 118 indicates that the data item belongs to this class. Accordingly, the classification data 118 is based on the probability scores generated by each analysis sub-model.

When each analysis sub-model is trained, their respective probability score data 136 will agree for the labeled data items 130. The respective probability score data 136 will not agree for first unlabeled data items due to the different sets of weights assigned to the weighted values in each of the functions. Accordingly, the combined probability score data will result in a spread of distributions in which no class has a substantially higher probability than all of the other classes. Thus, if all of the analysis sub-models are in agreement about a given data item, then there is a high degree of confidence in the classification of the data item. If the analysis sub-models do not agree about the classification of a data item, then there is low confidence in in the classification.

Additionally, when the analysis model 114 is trained, all of the analysis sub-models are simultaneously trained. The different initial values for the weighted values ensure that each analysis sub-model will generate a unique function F(x). Yet, despite the fact that each sub-model has generated a unique function F(x), each analysis sub-model will still generate a probability score that has a significantly higher score for a correct classification for data items that fall within the distribution of the labeled data items 130. Each analysis sub-model is trained to generate a probability score that does not have a significantly higher score for any particular classification for data items that fall outside the scope of the labeled data items 130.

Accordingly, the analysis model 114 obtains a wide distribution of probability scores for data items that fall outside the scope of the labeled data items 130 in two complementary ways. First, the different functions F(x) arrived at by each analysis sub-model make it likely that probability score distributions will differ among the analysis sub-models for data items that fall outside the scope of the labeled data items 130. Second, the training process explicitly trains each analysis sub-model to make a distribution of probability scores that does not result in a substantially higher probability score for any one category for those data items that fall outside the scope of the labeled data items 130.

In the example in which the output of each sub analysis model function F(x) includes two terms, the analysis model 114 outputs two terms that are the normalized sums of the first and second terms of the functions of the analysis sub-models. The first normalized term will have a significantly higher probability score for one of the classes for a data item that falls within the scope of the labeled data items 130. Neither the normalized first term nor the normalized second term will have a probability score for any one classes that is significantly higher than the probability scores for the other classifications.

Figure 3:
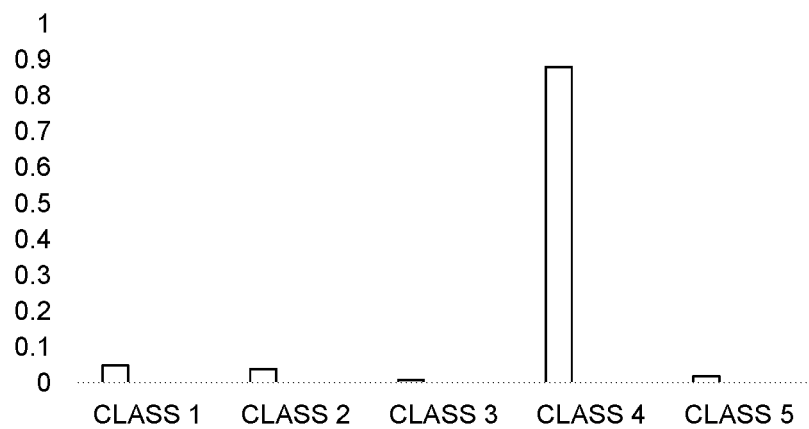
FIGS. 3-5 are representations of probability score distributions generated by an analysis model in accordance with various embodiments.

FIG. 3 is a graph 300 of probability scores for a given data item from the labeled data items 130 at the end of the machine learning process, according to one embodiment. In the example of FIG. 3, the analysis model 114 is trained to classify data items in accordance with one of five possible classifications. For a given data item, the analysis model generates a probability score that the data item belongs to each of the possible classifications. If one of the classifications has a greater than threshold probability score, then the analysis model 114 classifies the data item as belonging to that the classification.

In FIG. 3, the graph 300 indicates that the analysis model 114 has classified the labeled data item 130 as belonging to classification 4. In this example, classification 4 is the correct classification according to the label on the data item. The analysis model 114 has generated a probability score of 0.05 for class 1. The analysis model 114 has generated a probability score of 0.04 for class 2. The analysis model 114 has generated a probability score of 0.01 for class 3. The analysis model 114 has generated a probability score of 0.88 for class 4. The analysis model 114 has generated a classification score of 0.02 for class 5.

The probability score for each classification in the graph 300 is based on the probability scores from a plurality of analysis sub-models. For example, the probability score for each classification can correspond to an average of probability scores for that classification from the various sub-models.

Figure 4:
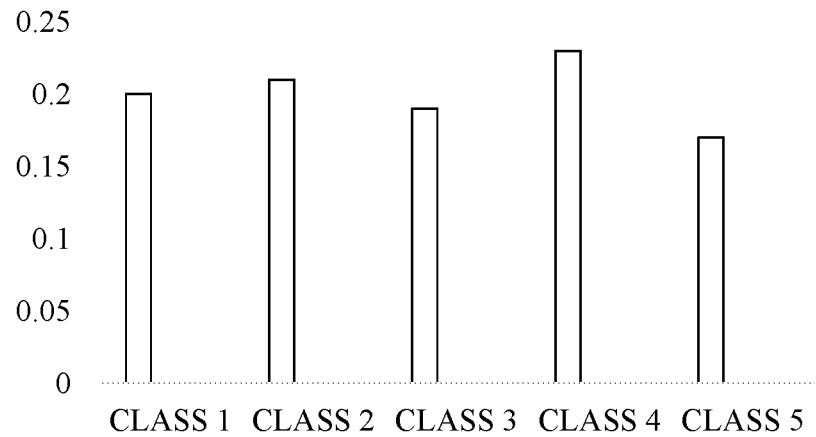

FIG. 4 is a graph 400 of probability scores for a given data item from the unlabeled data items 132 at the end of the machine learning process, according to one embodiment. In the example of FIG. 4, the analysis model 114 is trained to classify data items in accordance with one of five possible classifications. For a given data item, the analysis model 114 generates a probability score that the data item belongs to each of the possible classifications. If one of the classifications has a greater than threshold probability score, then the analysis model 114 classifies the data item as belonging to that the classification.

In FIG. 4, the graph 400 indicates that the analysis model 114 cannot confidently classify the data item as belonging to any one of the five possible classifications. The machine learning process has trained the analysis model 114 to generate probability score distributions for each first unlabeled data item 132 that minimize the confidence with which the first unlabeled data items 132 can be classified in any one of the possible classifications. Accordingly, the analysis model 114 seeks to generate, for each first unlabeled data item 132, a probability score distribution in which the probability scores for each classification are as uniform as possible, or at least to promote uniformity to a degree that the first unlabeled data item 132 cannot be classified confidently. In the example of FIG. 4, the analysis model 114 has generated a nearly even distribution of probability scores for this first unlabeled data item 132. The analysis model 114 has generated a probability score of 0.2 for class 1. The analysis model 114 has generated a probability score of 0.21 for class 2. The analysis model 114 has generated a probability score of 0.19 for class 3. The analysis model 114 has generated a probability score of 0.23 for class 4. The analysis model 114 has generated a classification score of 0.17 for class 5. Accordingly, the difference between the highest probability score and the second highest probability score is 0.02. The difference between the highest probability score and the lowest probability score of 0.06. This is a highly uniform distribution of probability scores, indicating that the analysis model 114 cannot confidently predict that this first unlabeled data item 132 belongs to anyone of the possible classifications.

The probability score for each classification in the graph 400 is based on the probability scores from a plurality of analysis sub-models. For example, the probability score for each classification can correspond to an average of probability scores for that classification from the various sub-models. Thus, the fact that the multiple sub-models do not agree on a classification results in more uniform distribution of the overall probability scores for each classification.

Figure 5:
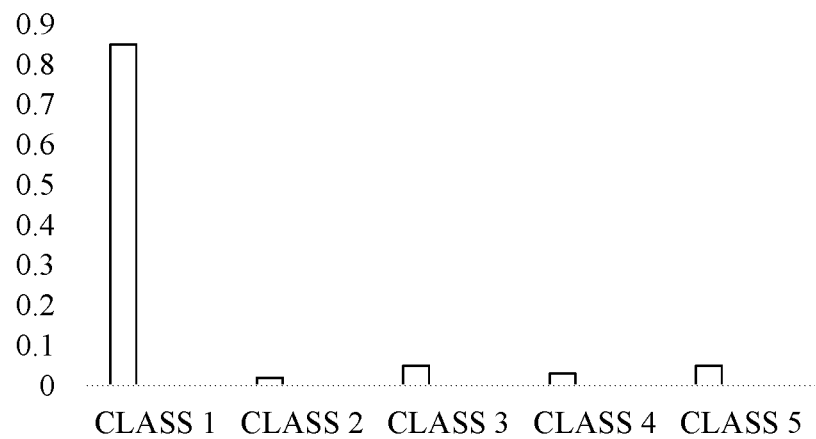

FIG. 5 is a graph 500 of probability scores for a given data item from the second unlabeled data items 134 at the end of the machine learning process, according to one embodiment. In the example of FIG. 5, the analysis model 114 is trained to classify data items in accordance with one of five possible classifications. For a given data item, the analysis model 114 generates a probability score that the data item belongs to each of the possible classifications. If one of the classifications has a greater than threshold probability score, then the analysis model 114 classifies the data item as belonging to that the classification.

In FIG. 5, the graph 500 indicates that the analysis model 114 has classified this particular second unlabeled data item 134 as belonging to classification 1. The analysis model 114 has generated a probability score of 0.85 for class 1. The analysis model 114 has generated a probability score of 0.02 for class 2. The analysis model 114 has generated a probability score of 0.05 for class 3. The analysis model 114 has generated a probability score of 0.03 for class 4. The analysis model 114 has generated a classification score of 0.05 for class 5. The machine learning process has trained the analysis model 114 to reduce the uncertainty in order to increase the confidence in classifying the second unlabeled data items 134. In this case, the analysis model 114 has confidently classified the unlabeled data item 134 as belonging to class 1.

The probability score for each classification in the graph 500 is based on the probability scores from a plurality of analysis sub-models. For example, the probability score for each classification can correspond to an average of probability scores for that classification from the various sub-models.

After the analysis model 114 has been trained, new or non-test data items can be passed to the analysis model 114 for classification. The analysis model 114 will generate, for each data item, a probability score distribution including probability scores for each possible classification. The analysis model can either confidently indicate a classification or indicate that a data item cannot be confidently classified.

Figure 6:
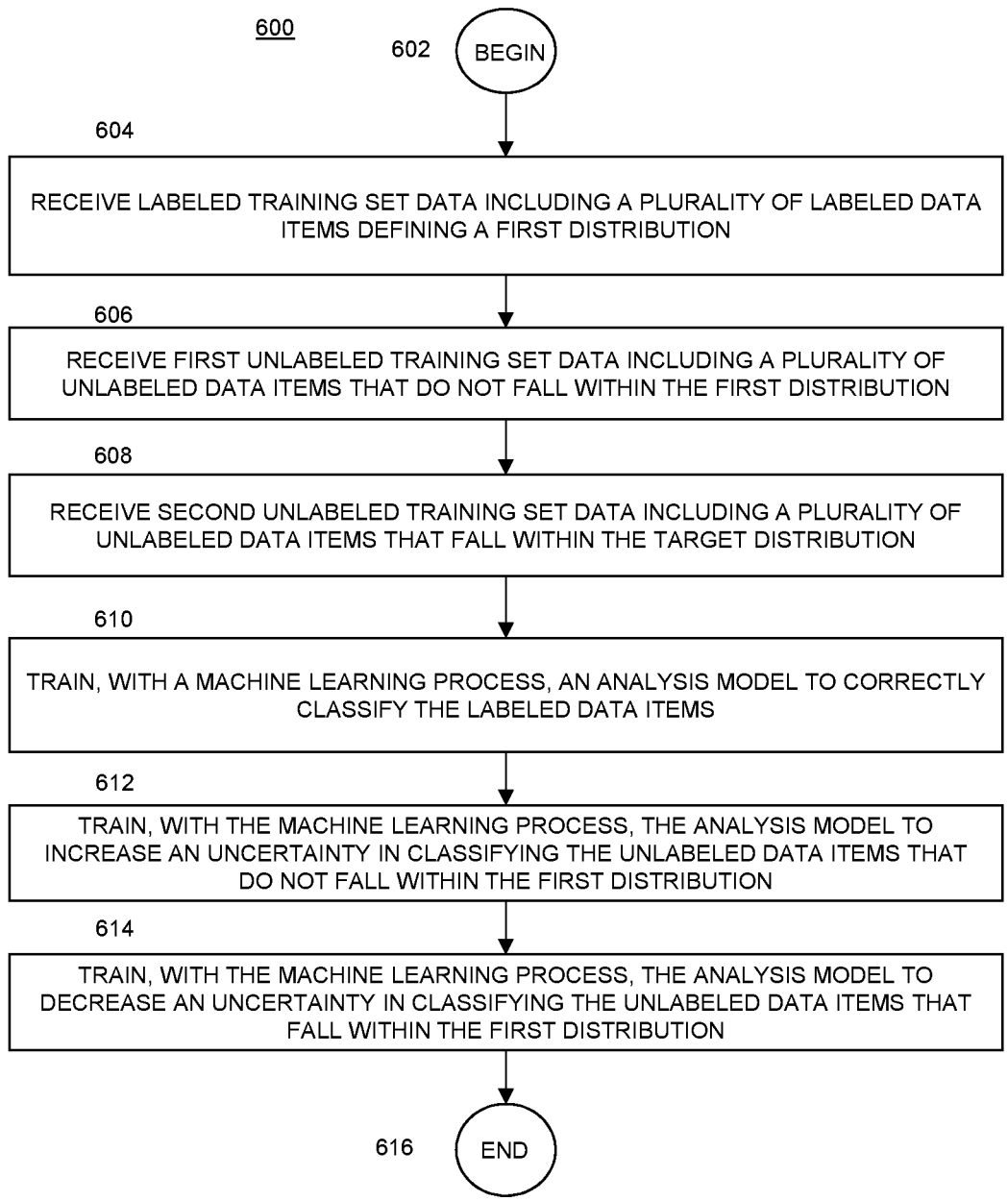
FIG. 6 is a flow diagram of a process for efficiently and effectively training an analysis model with a machine learning process, in accordance with one embodiment.

FIG. 6 illustrates a flow diagram of a process 600 for efficiently and effectively training an analysis model with a machine learning process, in various embodiments.

Referring to FIGS. 1-6, and the description of FIGS. 1-5 above, in one embodiment, process 600 begins at BEGIN 602 and process flow proceeds to 604.

At 604, labeled training set data is received including a plurality of labeled data items defining a first distribution, using any of the methods, processes, and procedures discussed above with respect to FIGS. 1-5. From block 604 process flow proceeds to 606.

At 606, first unlabeled training set data is received including a plurality of unlabeled data items that do not fall within the first distribution, using any of the methods, processes, and procedures discussed above with respect to FIGS. 1-5. From 606 process flow proceeds to 608.

At 608, second unlabeled training set data is received including a plurality of unlabeled data items that fall within the target distribution, using any of the methods, processes, and procedures discussed above with respect to FIGS. 1-5. From 608, process flow proceeds to 610.

At 610, an analysis model is trained, with a machine learning process, to correctly classify the labeled data items, using any of the methods, processes, and procedures discussed above with respect to FIGS. 1-5. From 610 process flow proceeds to 612.

At 612, the analysis model is trained, with the machine learning process, to increase an uncertainty in classifying the unlabeled data items that do not fall within the first distribution, using any of the methods, processes, and procedures discussed above with respect to FIGS. 1-5. From 612, process flow proceeds to 614.

At 614, the analysis model is trained, with the machine learning process, to decrease an uncertainty in classifying the unlabeled data items that fall within the first distribution, using any of the methods, processes, and procedures discussed above with respect to FIGS. 1-5. From 614 process flow proceeds to 616.

At 616 the process 600 for efficiently and effectively training an analysis model with a machine learning process is exited to await new data and/or instructions. using any of the methods, processes, and procedures discussed above with respect to FIGS. 1-5.

Figure 7:
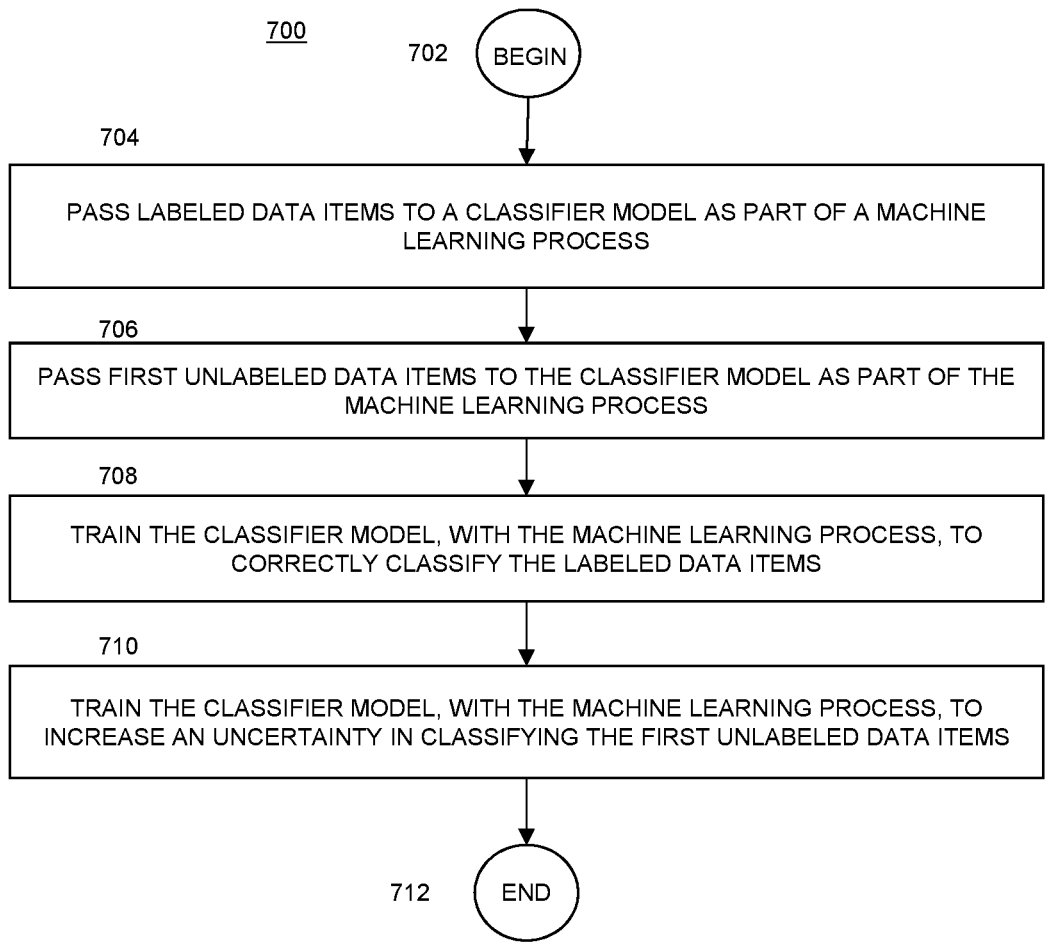
FIG. 7 is a flow diagram of a process for efficiently and effectively training an analysis model with a machine learning process, in accordance with one embodiment.

FIG. 7 illustrates a flow diagram of a process 700 for efficiently and effectively training an analysis model with a machine learning process, in various embodiments.

Referring to FIG. 7, FIGS. 1-5, and the description of FIGS. 1-5 above, the process 700 begins at 702. From 702 process flow proceeds to 704.

At 704 labeled data items are passed to a classifier model as part of a machine learning process using any of the methods, processes, and procedures discussed above with respect to FIGS. 1-5. From block 704 process flow proceeds to block 706.

At 706 first unlabeled data items are passed to the classifier model as part of the machine learning process, using any of the methods, processes, and procedures discussed above with respect to FIGS. 1-5. From 706 process flow proceeds to 708.

At 708 the classifier model is trained, with the machine learning process, to correctly classify the labeled data items, using any of the methods, processes, and procedures discussed above with respect to FIGS. 1-5. From 708 process flow proceeds to 710. From 708 process flow proceeds to 710.

At 710 the classifier model is trained, with the machine learning process, to increase an uncertainty in classifying the first unlabeled data items, using any of the methods, processes, and procedures discussed above with respect to FIGS. 1-5. From 710 process flow proceeds to 712.

At 712 the process 700 for efficiently and effectively training an analysis model with a machine learning process is exited to await new data and/or instructions.

As noted, the specific illustrative examples discussed above are but illustrative examples of implementations of embodiments of the method or process for efficiently and effectively training an analysis model with a machine learning process. Those of skill in the art will readily recognize that other implementations and embodiments are possible. Therefore, the discussion above should not be construed as a limitation on the claims provided below.

Disclosed herein is a method for efficiently and effectively training an analysis model with a machine learning process.

The method includes receiving labeled training set data including a plurality of labeled data items defining a first distribution, receiving first unlabeled training set data including a plurality of unlabeled data items that do not fall within the first distribution, and receiving second unlabeled training set data including a plurality of unlabeled data items that fall within the target distribution. The method includes training, with a machine learning process, an analysis model to correctly classify the labeled data items, training, with the machine learning process, the analysis model to increase an uncertainty in classifying the unlabeled data items that do not fall within the first distribution, and training, with the machine learning process, the analysis model to decrease an uncertainty in classifying the unlabeled data items that fall within the first distribution.

Embodiments of the present disclosure address some of the shortcomings associated with traditional processes for training machine learning models. A data management system in accordance with one or more embodiments provides an analysis model that confidently classifies data items that fall within a scope of labeled training set data items, while ensuring a lack of confidence in classifying data items that do not fall within the scope of the labeled training set data items. The various embodiments of the disclosure can be implemented to improve the technical fields of machine learning, data processing, data management, data transmission, data analysis, and data collection. Therefore, the various described embodiments of the disclosure and their associated benefits amount to significantly more than an abstract idea.

The disclosed method and system for efficiently and effectively training an analysis model with a machine learning process provide for the processing and storing of smaller amounts of data, i.e., by training a single analysis model with a single machine learning process to correctly classify in-scope data items and to indicate lack of confidence in classifying out-of-scope data items; thereby eliminating unnecessary data analysis and storage. Consequently, using the disclosed method and system for efficiently and effectively training an analysis model with a machine learning process results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for efficiently and effectively training an analysis model with a machine learning process.

Using the disclosed embodiments of a method and system for efficiently and effectively training an analysis model with a machine learning process, a method and system for efficiently and effectively training an analysis model with a machine learning process more accurately is provided. Therefore, the disclosed embodiments provide a technical solution to the long-standing technical problem of accurately and efficiently classifying relevant data items with an analysis model while refraining from confidently classifying data items beyond the scope of the labeled training set.

The result is a much more accurate, adaptable, and robust method and system for efficiently and effectively training an analysis model with a machine learning process. This, in turn, results in: less human and processor resources being dedicated to overcoming the consequences of unduly confident classifications, because more accurate and efficient analysis methods can be implemented, i.e., less time required for analysis by humans, usage of fewer processing resources, usage of fewer memory storage assets, and less communication bandwidth being utilized to transmit data for analysis.

The disclosed method and system for efficiently and effectively training an analysis model with a machine learning process does not encompass, embody, or preclude other forms of innovation in the area of training set labeling systems. In addition, the disclosed method and system for efficiently and effectively training an analysis model with a machine learning process is not related to any fundamental economic practice, fundamental data processing practice, mental steps, or pen and paper-based solutions, and is, in fact, directed to providing solutions to new and existing problems associated with machine learning processes. Consequently, the disclosed method and system for efficiently and effectively training an analysis model with a machine learning process, does not encompass, and is not merely, an abstract idea or concept.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for training an analysis model with a machine learning process, the method comprising:
    passing labeled data items to a plurality of analysis sub-models each of which is a classifier model as part of a machine learning process;
    passing first unlabeled data items to the plurality of analysis sub-models as part of the machine learning process;
    training the plurality of analysis sub-models, with the machine learning process, to correctly classify the labeled data items; and
    training the plurality of analysis sub-models, with the machine learning process, to increase an uncertainty in classifying the first unlabeled data items;
    wherein each sub-model in the plurality of analysis sub-models is trained with a respective different function that produces a probability score and the plurality of analysis sub-models generates a combined probability score for each of a plurality of classifications, and the machine learning process trains the plurality of analysis sub-models to generate a probability score distribution of the combined probability scores for the plurality of classifications for each of the labeled data items that correctly classifies the labeled data items and trains the plurality of analysis sub-models to increase uniformity in the probability score distribution of the combined probability scores for the plurality of classifications for each of the first unlabeled data items to increase the uncertainty in classifying the first unlabeled data items.

2. The method of claim 1, wherein the labeled data items define a labeled data item distribution, wherein the first unlabeled data items fall outside the labeled data item distribution.

3. The method of claim 2, wherein the first unlabeled data items are of types not included in the labeled data item distribution.

4. The method of claim 2, further comprising:
passing second unlabeled data items to the plurality of analysis sub-models; and
training the plurality of analysis sub-models, with the machine learning process, to reduce an uncertainty in classifying the second unlabeled data items.

5. The method of claim 4, wherein the second unlabeled data items fall within the labeled data item distribution.

6. The method of claim 5, wherein the second unlabeled data items have characteristics that correspond to characteristics of the labeled data items.

7. The method of claim 5, wherein the plurality of analysis sub-models is trained, with the machine learning process, to calculate, for each data item and for each of a plurality of possible classifications, a probability score corresponding to a probability that the data item belongs to each respective classification.

8. The method of claim 7, wherein training the plurality of analysis sub-models, with the machine learning process, to increase the uncertainty in classifying the first unlabeled data items comprises training the plurality of analysis sub-models to reduce a sum of differences between probability scores for the plurality of possible classifications.

9. The method of claim 7, further comprising training the plurality of analysis sub-models, with the machine learning process, to decrease the uncertainty for a second unlabeled data item by increasing a difference between a highest probability score and a second highest probability score.

10. A method for training an analysis model with a machine learning process, the method comprising:
receiving labeled training set data including a plurality of labeled data items defining a first distribution;
receiving first unlabeled training set data including a plurality of unlabeled data items that do not fall within the first distribution;
receiving second unlabeled training set data including a plurality of unlabeled data items that fall within the first distribution;
training, with a machine learning process, an analysis model to correctly classify the labeled data items;
training, with the machine learning process, the analysis model to increase an uncertainty in classifying the unlabeled data items that do not fall within the first distribution; and
training, with the machine learning process, the analysis model to decrease an uncertainty in classifying the unlabeled data items that fall within the first distribution;
wherein the analysis model includes a plurality of analysis sub-models each trained with a respective different function that produces a probability score and the plurality of analysis sub-models generates a combined probability score for each of a plurality of classifications, and the machine learning process trains the plurality of analysis sub-models to generate a probability score distribution of the combined probability scores for the plurality of classifications for each of the labeled data items that correctly classifies the labeled data items, and trains the plurality of analysis sub-models to increase uniformity in the probability score distribution of the combined probability scores for the plurality of classifications for each of the unlabeled data items that do not fall within the first distribution to increase the uncertainty in classifying the first unlabeled data items that do not fall within the first distribution.

11. The method of claim 10, wherein the unlabeled data items that fall within the first distribution correspond to data items from the labeled training set data without labels.

12. The method of claim 10, wherein, for each data item during the machine learning process, the plurality of analysis sub-models calculates, for each of a plurality of possible classifications, a respective probability score corresponding to a probability that the data item belongs to the classification.

13. The method of claim 12, wherein training the analysis model to increase the uncertainty in classifying the unlabeled data items that do not fall within the first distribution includes training the plurality of analysis sub-models to generate, for each unlabeled data item that does not fall within the first distribution, a distribution of probabilities for the plurality of possible classifications that collectively does not indicate that the data item likely belongs to any of the classifications.

14. The method of claim 13, wherein increasing the uncertainty for an unlabeled data item includes reducing a difference between a greatest probability score and a lowest probability score.

15. The method of claim 13, wherein increasing the uncertainty for an unlabeled data item includes increasing an entropy calculated from the probability scores for each possible classification.

16. The method of claim 10, wherein training the analysis sub-models includes providing, for the respective function of each sub-model, a set of different initial values for weights associated with the functions.

17. A system for training an analysis model with a machine learning process, the system comprising:
at least one processor; and
at least one memory coupled to the at least one processor, the at least one memory having stored therein instructions which, when executed by any set of the at least one processor, perform a process including:
receiving labeled training set data including a plurality of labeled data items defining a first distribution;
receiving first unlabeled training set data including a plurality of unlabeled data items that do not fall within the first distribution;
receiving second unlabeled training set data including a plurality of unlabeled data items that fall within the first distribution;
training, with a machine learning process, an analysis model to correctly classify the labeled data items;
training, with the machine learning process, the analysis model to increase an uncertainty in classifying the unlabeled data items that do not fall within the first distribution; and
training, with the machine learning process, the analysis model to decrease an uncertainty in classifying the unlabeled data items that fall within the first distribution;
wherein the analysis model includes a plurality of analysis sub-models each trained with a respective different function that produces a probability score and the plurality of analysis sub-models generates a combined probability score for each of a plurality of classifications, and the machine learning process trains the plurality of analysis sub-models to generate a probability score distribution of the combined probability scores for the plurality of classifications for each of the labeled data items that correctly classifies the labeled data items and trains the plurality of analysis sub-models to increase uniformity in the probability score distribution of the combined probability scores for the plurality of classifications for each of the unlabeled data items that do not fall within the first distribution to increase the uncertainty in classifying the first unlabeled data items that do not fall within the first distribution.

18. The system of claim 17, wherein training the analysis model to reduce the uncertainty in classifying the unlabeled data items that fall within the first distribution includes training the plurality of analysis sub-models to generate, for each unlabeled data item that falls within the first distribution, a distribution of probabilities for a plurality of possible classifications that includes a higher than threshold probability score for one of the classifications.

19. The system of claim 17, further comprising, after training the analysis model with the machine learning process:
   passing non-test data items through the analysis model;
   classifying, with the analysis model, non-test data items that have a greater than threshold probability of belong to one of a plurality of classifications; and
   outputting, with the analysis model for non-test data items that do not have a higher than threshold probability of belonging to one of the plurality of classifications, an indication that the non-test data items cannot be confidently classified.

\* \* \* \* \*